(12) United States Patent
Côté et al.

(10) Patent No.: US 10,841,181 B2
(45) Date of Patent: Nov. 17, 2020

(54) MONITORING AND AUTO-CORRECTION SYSTEMS AND METHODS FOR MICROSERVICES

(71) Applicant: Ciena Corporation, Hanover, MD (US)

(72) Inventors: David Côté, Gatineau (CA); Arslan Shahid, Ottawa (CA); Thomas Triplet, Manotick (CA)

(73) Assignee: Ciena Corporation, Hanover, MD (US)

( * ) Notice: Subject to any disclaimer, the term of this patent is extended or adjusted under 35 U.S.C. 154(b) by 330 days.

(21) Appl. No.: 15/441,645

(22) Filed: Feb. 24, 2017

(65) Prior Publication Data
US 2018/0248771 A1 Aug. 30, 2018

(51) Int. Cl.
*G06F 15/173* (2006.01)
*H04L 12/24* (2006.01)
*H04L 12/26* (2006.01)

(52) U.S. Cl.
CPC ...... *H04L 41/5025* (2013.01); *H04L 41/0893* (2013.01); *H04L 41/5009* (2013.01); *H04L 43/10* (2013.01)

(58) Field of Classification Search
CPC . H04L 41/5041; H04L 43/10; H04L 41/5032; H04L 41/5035; H04L 41/5054
USPC ........................................................ 709/224
See application file for complete search history.

(56) References Cited

U.S. PATENT DOCUMENTS

| | | | |
|---|---|---|---|
| 8,375,122 B2 * | 2/2013 | Sheng ................. | G06F 11/3495 370/352 |
| 9,363,301 B2 | 6/2016 | Lawson et al. | |
| 9,485,660 B2 | 11/2016 | Cote et al. | |
| 9,532,227 B2 | 12/2016 | Richards et al. | |
| 2012/0079098 A1 * | 3/2012 | Moehler ............. | G06F 11/0775 709/224 |
| 2014/0310243 A1 * | 10/2014 | McGee ............. | G06F 17/30575 707/639 |
| 2016/0112475 A1 * | 4/2016 | Lawson ................ | H04L 65/403 709/204 |
| 2016/0124742 A1 | 5/2016 | Rangasamy et al. | |
| 2016/0225044 A1 * | 8/2016 | Lawson ................. | G06Q 30/04 |
| 2016/0269425 A1 | 9/2016 | Shieh et al. | |
| 2016/0315830 A1 | 10/2016 | Cote et al. | |
| 2017/0116014 A1 * | 4/2017 | Yang ................... | G06F 9/45558 |
| 2018/0165604 A1 * | 6/2018 | Minkin ................. | G06F 15/18 |

FOREIGN PATENT DOCUMENTS

| | | |
|---|---|---|
| CN | 105933448 A | 9/2016 |
| CN | 105959390 A | 9/2016 |

* cited by examiner

*Primary Examiner* — Umar Cheema
*Assistant Examiner* — Anh Nguyen
(74) *Attorney, Agent, or Firm* — Clements Bernard Walker; Lawrence A. Baratta, Jr.; Christopher L. Bernard (57) ABSTRACT

A monitoring system for microservices includes a messaging system communicatively coupled to a plurality of services, wherein the messaging system is configured to publish metrics from the plurality of services to the analytics engine; an analytics engine communicatively coupled to the messaging system, wherein the analytics engine is configured to analyze the metrics to determine insights related to operation of the plurality of services; and a policy engine communicatively coupled to the analytics engine, wherein the policy engine is configured to determine actions associated with one or more services based on the analysis and push the actions to the one or more services for implementation.

18 Claims, 4 Drawing Sheets

FIG. 5 ism, wherein the analytics engine is configured to analyze the metrics to determine insights related to operation of the plurality of microservices; and a policy engine communicatively coupled to the analytics engine, wherein the policy engine is configured to determine actions associated with one or more microservices based on the analysis and push the actions to the one or more microservices for implementation. The monitoring system can further include a database communicatively coupled to the messaging system and the analytics engine, wherein the database is configured to store historical metrics, wherein the analytics engine performs one or more of a streaming mode which analyzes the metrics from the messaging system, a batch mode which analyzes the historical metrics in the database, and a combination of the streaming mode and the batch mode.

MONITORING AND AUTO-CORRECTION SYSTEMS AND METHODS FOR MICROSERVICES

FIELD OF THE DISCLOSURE

The present disclosure generally relates to software systems and methods. More particularly, the present disclosure relates to monitoring and auto-correction systems and methods for microservices.

BACKGROUND OF THE DISCLOSURE

A Service-Oriented Architecture (SOA) is an approach in computer software design in which application components provide services to other components via a communications protocol such as over a network. The principles of service-orientation are independent of any vendor, product, or technology. A service is a self-contained unit of functionality and services can be combined to provide the functionality of a large software application. Every computer can run any number of services, and each service is built in a way that ensures that the service can exchange information with any other service in the network without human interaction and without the need to make changes to the underlying program itself. Microservices are a variant of SOA used to build distributed software systems. Similar to SOA, services in a Microservice Architecture (MSA) are processes that communicate with each other over the network in order to fulfill an objective, and these services use technology-agnostic protocols. In a Microservice Architecture, services should be small, and the protocols should be lightweight. The benefit of distributing different responsibilities of the system into different smaller services is that it enhances the cohesion and decreases the coupling. This makes it much easier to change and add functions and qualities to the system anytime.

Conventionally, a monitoring system which collects performance metrics in a Microservice Architecture can only collect performance monitoring metrics via log files on individual devices. There is no ability to analyze metrics on the fly, in real-time. In conventional operation, the log data would be written in disparate files, such as one per microservice, with no central structure. In more advanced cases, the logs could be centralized in single file and could even be visualized with tools (e.g., Grafana). However, these conventional approaches do not enable complex data analysis or self-corrective auto-actions. It is left to the user to look at the metrics, derive conclusions, and perform manual corrections. Thus, conventional approaches to monitoring microservices have various limitations including no flexibility to add new metric sinks (i.e., monitor new services) without a need to refactor code in other components of the system; no way of performing complex analysis on performance metrics in real-time; an inability to perform time-series and trend analysis on performance metrics; an inability to auto-correct and/or auto-tune the system in real-time without any manual intervention; lacking of scalability and resilience; and the like

BRIEF SUMMARY OF THE DISCLOSURE

In an exemplary embodiment, a monitoring system for microservices includes a messaging system communicatively coupled to a plurality of microservices, wherein the messaging system is configured to publish metrics from the plurality of microservices to the analytics engine; an analytics engine communicatively coupled to the messaging The plurality of microservices can each include one of a metric sink which publishes its associated metrics to the messaging system and a data retrieval agent which queries the associated microservices for the associated metrics and performs a push to the messaging system. The messaging system can receive the metrics in varying formats from the plurality of microservices and converts the varying formats to a single schema. The determined actions can be based on user-defined rules and pushed to adapters associated with the one or more microservices. The monitoring system can further include a visualization engine which provides visualizations of the metrics for all of the plurality of microservices in a unified manner. Two or more of the plurality of microservices can be executed on different physical hardware interconnected by a network. The determined actions can include one or more of adjusting disk storage locations, scaling computational nodes, and implementing additional microservices. The messaging system can receive heartbeat messages from each of the plurality of microservices which are monitored by the analytics engine, and wherein the policy engine is configured to restart a microservice responsive to a lack of the heartbeat messages. The analysis can determine the insights related to present state of the microservices and a forecasted future state of the microservices.

In another exemplary embodiment, a monitoring method for microservices includes receiving metrics from a messaging system published by a plurality of microservices operating in a software system; performing analysis with the metrics using an analytics engine to determine insights related to operation of the plurality of microservices; and determining actions associated with one or more microservices based on the analysis using a policy engine and pushing the actions to the one or more microservices for implementation. The monitoring method can further include storing historical metrics in a database communicatively coupled to the analytics engine, wherein the analytics engine performs one or more of a streaming mode which analyzes the metrics from the messaging system, a batch mode which analyzes the historical metrics in the database, and a combination of the streaming mode and the batch mode. The plurality of microservices can each include one of a metric sink which publishes its associated metrics to the messaging system and a data retrieval agent which queries the associated microservice for the associated metrics and performs a push to the messaging system.

The messaging system can receive the metrics in varying formats from the plurality of microservices and converts the varying formats to a single schema. The determined actions can be based on user-defined rules and pushed to adapters associated with the one or more microservices. The monitoring method can further include providing visualizations of the metrics for all of the plurality of microservices in a unified manner via a visualization engine. Two or more of the plurality of microservices can be executed on different physical hardware interconnected by a network. The determined actions can include one or more of adjusting disk storage locations, scaling computational nodes, and implementing additional microservices. The messaging system can receive heartbeat messages from each of the plurality of microservices which are monitored by the analytics engine, and wherein the policy engine is configured to restart a microservice responsive to a lack of the heartbeat messages.

In a further exemplary embodiment, an apparatus for microservices monitoring and auto-correction includes one or more processors; and memory storing instructions that, when executed, cause the one or more processors to receive metrics from a messaging system published by a plurality of microservices operating in a software system, perform analysis with the metrics using an analytics engine to determine insights related to operation of the plurality of microservices, and determine actions associated with one or more microservices based on the analysis using a policy engine and pushing the actions to the one or more microservices for implementation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to monitoring and auto-correction systems and methods for microservices. The systems and methods provide a flexible, scalable, and resilient engine for self-monitoring and self-correction of microservices. This is achieved by enabling a) centralized collection and storage of performance metrics captured from disparate services in the system, b) distributed (parallel) analysis of historical and current performance metrics in near real-time to generate insights, and c) mapping insights to corrective actions in the system to automatically recover from faults, elastically scale resources or optimize performance. The systems and methods can be realized as a self-monitoring engine which collects metrics from software systems, e.g., microservices or other distributed software architectures. The self-monitoring engine leverages a distributed publisher-consumer message bus to cleanly decouple performance-monitoring sinks from data analysis in a flexible, scalable, and resilient manner.

Additionally, the systems and methods can include an analytics engine which extracts insights from the self-monitoring data in near real-time. The analytics engine can combine the self-monitoring data with external data sources. The analytics engine can support an arbitrarily large number of concurrent data analysis processes, use time-series of historical data to measure trends and patterns, support an arbitrarily complex data analysis (e.g., machine learning). Insights from the analytics engine can be used to characterize the present start of the system and to forecast the future state of the system.

The system and methods can also include a policy engine which can consume the insights from the analytics engine to trigger the execution of corrective actions, such as using internal or third-party software. The policy engine can react automatically and in near real-time. The corrective actions can include notifications to operators (e.g., JIRA ticket) or machines (e.g., re-route service via a Software Defined Networking (SDN) controller). The systems and method can be equally used for monitoring and correcting external systems.

Exemplary Microservices System

Figure 1:
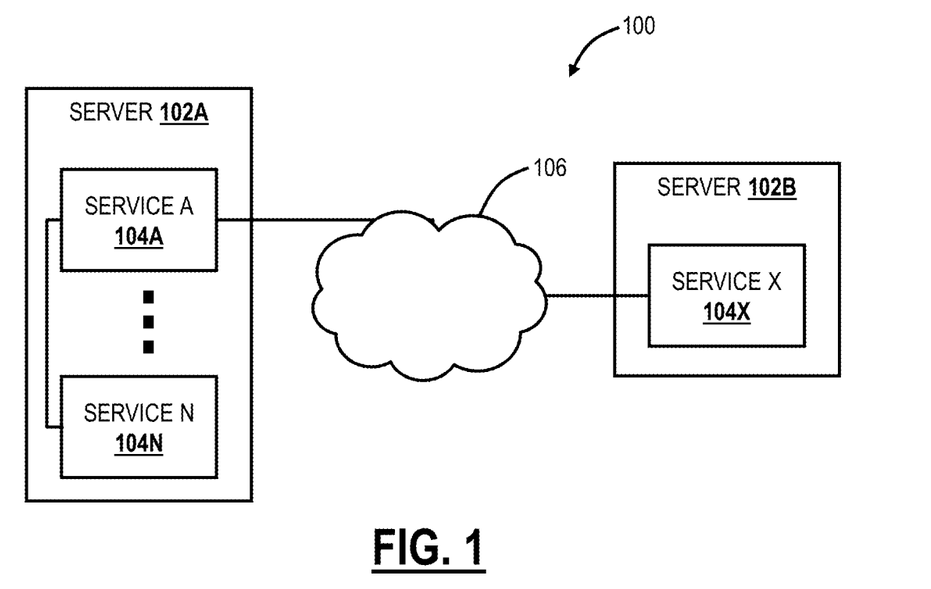
FIG. 1 is a network diagram of a services system with two exemplary servers executing exemplary services.

Referring to FIG. 1, in an exemplary embodiment, a network diagram illustrates a services system 100 with two exemplary servers 102A, 102B executing exemplary services 104A, 104N, 104X. In this example, the server 102A executes the services 104A, 104N, and the server 102B executes the service 104X. The servers 102A, 102B are communicatively coupled to one another over a network 106. The network 106 can be a Local Area Network (LAN), a wireless LAN (WLAN), a Wide Area Network (WAN), a data center network, the Internet, any other type of network, and a combination thereof. The servers 102A, 102B can be physical servers in racks, Virtual Machines (VM), blades, or the like. The services 104A, 104N, 104X can be microservices or any other type of service in an SOA or other distributed software architecture. The services 104A, 104N, 104X are each a self-contained unit of functionality, and each can communicate with one another. The services 104A, 104N, 104X can be organized around their capabilities. The services 104A, 104N, 104X can be implemented using different programming languages, databases, hardware and software environment, etc. The services 104A, 104N and the service 104X are illustrated on different physical hardware. As described herein, performance monitoring of each is siloed such that there is no unified view of the collective operations of these services 104A, 104N, 104X. Rather, the conventional approaches to performance monitoring are localized to the servers 102A, 102B.

Software systems, such as the system 100, leveraging a microservice architecture include a set of independent processes (denoted as the services 104A, 104N, 104X) that communicate via the network 106 to accomplish the desired goal. The microservice architecture facilitates the development of modular software. In contrast to a monolithic architecture (single service), the services 104A, 104N, 104X in a microservice architecture are typically small and atomic, that is, they perform a single function. They communicate with each other via lightweight technology agnostic network protocols.

This architecture provides the various advantages. This architecture provides ease of development as each service 104A, 104N, 104X is small and focused, it includes a smaller code base, which is easier to understand, modify, test and deploy. This architecture provides flexibility and reusability as the microservices perform a single function and are independent of each other, this architecture facilitates and encourages the development of reusable components (microservices) that can be combined in a flexible way to perform the desired action. This microservice architecture enables the use of different technologies (i.e., programming languages) for different services 104A, 104N, 104X in the system 100, resulting in greater flexibility to select the technology best suited to perform the desired job.

This architecture improves scalability and resilience. In order to scale a large monolithic system, the complete system has to be scaled together. On the other hand, when a microservice becomes a performance bottleneck, it can be scaled independently of the rest of the application, resulting in an optimized usage of the infrastructure. If a monolithic application encounters a failure, a nearly complete loss of functionality is experienced. In contrast, if a microservice fails only a particular, relatively small, loss of functionality is experienced that is much easier to debug and rectify. Microservices are also more lightweight and faster to reboot, resulting in short downtime in the case of a failure.

Although the microservice architecture has the advantages listed above, it introduces some new challenges compared to monolithic systems. This architecture increases the complexity of the system 100 by creating independent services 104A, 104N, 104X that communicate via the network 106, hence managing network latency, achieving high message throughputs, enabling load balancing and fault tolerance becomes very challenging. These difficulties arise from the fact that the services 104A, 104N, 104X are independent and may be distributed on multiple machines (the servers 102A, 102B) which renders traditional intra-service performance monitoring and/or analysis insufficient for successful system monitoring. In order to truly monitor, troubleshoot and tune the system 100, the performance metrics/indicators from all the services 104A, 104N, 104X should be captured and analyzed collectively. Also, the system 100 has a lot of interaction points between different microservices, which increases possible failure points. Moreover, the scalability model for each individual service 104A, 104N, 104X is hard to establish prior to a deployment, which often results in a non-optimal run-time system configuration. In essence, for a reasonably large microservices-based system, it is nearly impossible to monitor, troubleshoot and tune the entire system in real-time without having an automated solution for system-wide analysis of performance metrics and an automatic agent that performs corrective measures in the system based on actionable insights generated from the data.

Exemplary Server

Figure 2:
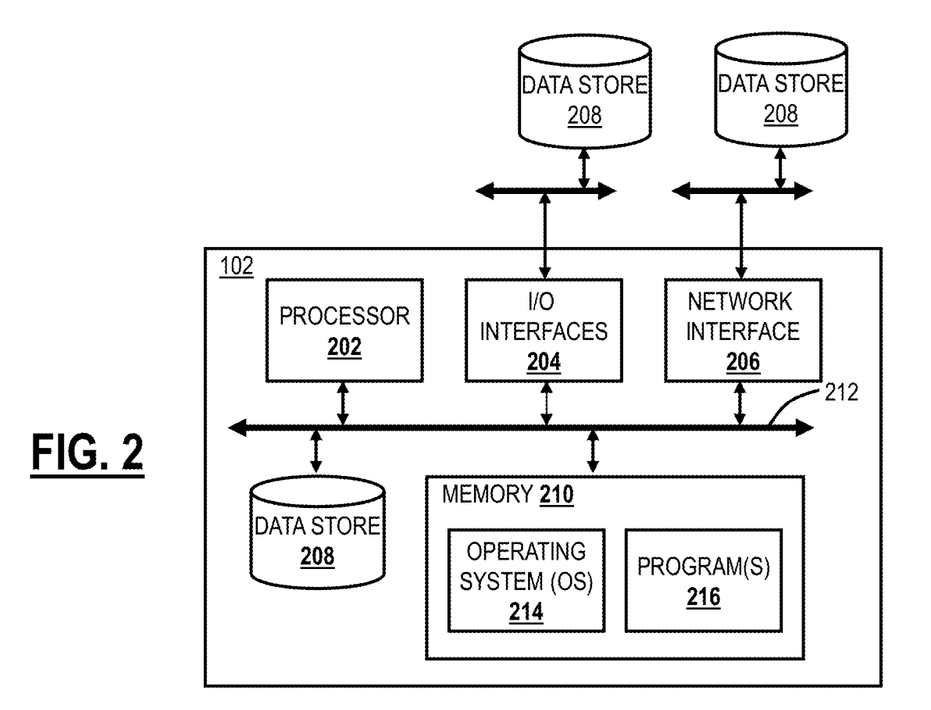
FIG. 2 is a block diagram of an exemplary implementation of a server.

Referring to FIG. 2, in an exemplary embodiment, a block diagram illustrates an exemplary implementation of the server 102. The server 102 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 102 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 102, a semiconductor-based microprocessor (in the form of a microchip or chip set), or generally any device for executing software instructions. When the server 102 is in operation, the processor 202 is configured to execute software stored within the memory 210, to communicate data to and from the memory 210, and to generally control operations of the server 102 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 102 to communicate on a network, such as the network 106. The network interface 206 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 102 such as, for example, an internal hard drive connected to the local interface 212 in the server 102. Additionally, in another embodiment, the data store 208 can be located external to the server 102 such as, for example, an external hard drive connected to the I/O interfaces 304 (e.g., SCSI or USB connection). In a further embodiment, the data store 208 can be connected to the server 102 through a network, such as, for example, a network attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. The services 104 can be instructions in the memory 210 and/or the data store 208 which are executed by the processor 202.

Monitoring System in for Microservices

Figure 3:
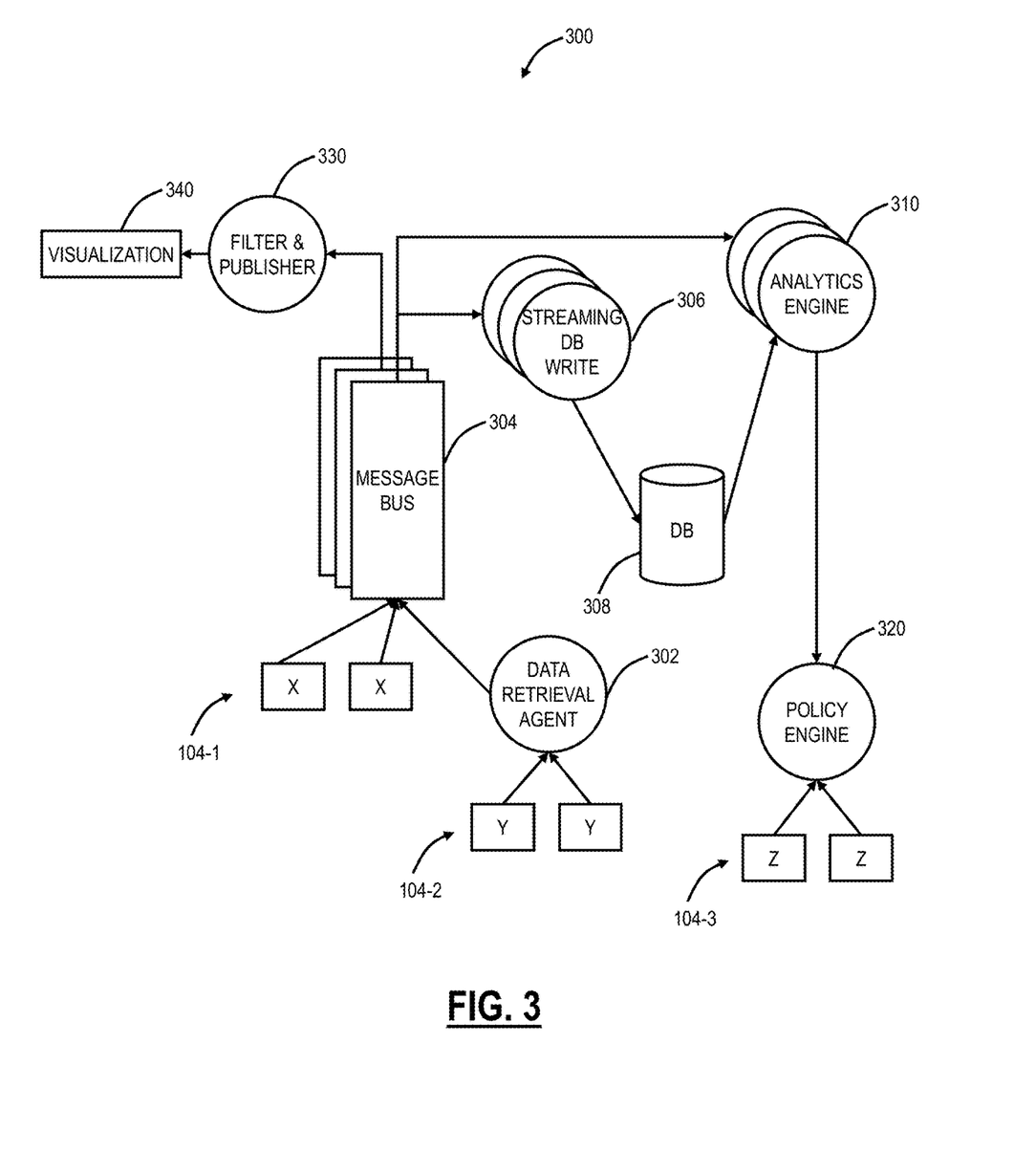
FIG. 3 is a network diagram of a monitoring system.

Referring to FIG. 3, in an exemplary embodiment, a network diagram illustrates a monitoring system 300. Collectively, the monitoring system 300 includes the self-monitoring engine, the analytics engine, and the policy engine. The monitoring system 300 provides a flexible, scalable and resilient engine for self-monitoring and self-correction of microservices. This achieved by enabling a) centralized collection and storage of performance metrics captured from disparate services in the system, b) distributed (parallel) analysis of historical and current performance metrics in near real-time to generate insights, and c) mapping insights to corrective actions in the system to automatically recover from faults, elastically scale resources or optimize performance. As described herein, an engine includes software executed on a processing device to perform associated functions.

Components of the monitoring system 300 include a data retrieval agent 302, a message bus 304, a streaming database write engine 306, a database 308, an analytics engine 310, a policy engine 320, a filter and publisher engine 330, and a visualization engine 340. For illustration purposes, FIG. 3 includes services 104-1, 104-2, 104-3. The services 104-1 include an embedded sink and are directly connected to the message bus 304. The services 104-2 do not include an embedded sink and connect to the message bus 304 through the data retrieval agent 302. The services 104-3 include service correction adapters and are controlled by the policy engine 320. The visualization engine 340 can provide graphical representations for a user, based on the streaming database write engine 306.

The monitoring system 300 includes two mechanisms to collect metrics from the services 104-1, 104-2, namely (1) metric sinks, i.e., components that constantly publish metric data to the message bus 304, and the metric sinks can be embedded in the services 104-1, and (2) in case where there is not an ability to configure the services 104-2 to report metrics directly to the message bus 304, the data retrieval agent 302 can query for metrics using Application Programming Interfaces (APIs) and push the retrieved metrics to the message bus 304. As described herein, the metrics can include any performance monitoring data associated with the services 104-1, 104-2 including, for example, processor utilization, memory utilization, run-time statistics, remote calls, requests, threads, connections, authentication, etc.

The objective of the monitoring system 300 is to collect and consolidate all the metrics from the services 104-1, 104-2, 104-3 in the same system, i.e., the monitoring system 300, using the same schema such that rest of the monitoring system 300 can deal with the metrics in a generic manner. Of note, not all of the services 104-1, 104-2, 104-3 will report metrics using the same system and/or schema. Accordingly, the embedded sinks in the services 104-1 and the data retrieval agent 302 normalize collected data to a common schema. As known in the art, schema refers to how data is described in a formal language for the database 308. This approach provides flexibility to add metric sinks in the monitoring system 300 without a need to refactor or change the logic in other components of the system.

Message Bus

The message bus 304 is a distributed publisher-consumer message bus (e.g., Apache Kafka) to cleanly decouple metric collection either directly from the services 104-1 or from the data retrieval agent 302 from data analysis via the analytics engine 310 and data storage in the database 308 via the streaming database write engine 306. The message bus 304 can allow multiple topics and multiple partitions to be created for the same type of data sources (e.g., performance metrics), which may be distributed and can optionally support data replication to guard against loss of data. It is possible to increase the number of partitions to scale the monitoring system 300 horizontally. On the publisher side, a set of sinks could be associated with a particular partition to load balance sinks between partitions and achieve high write throughputs on the message bus 300. On the consumer side, the same model can be followed to scale horizontally and implement a set of streaming-like jobs for each topic that can perform tasks of arbitrary complexity while achieving high read throughput.

The monitoring system 300 decouples the metric collection from analysis by using a distributed publisher-consumer message bus. Also, the performance metrics published on the message bus 304 conform to a common schema. This helps in keeping the metrics in a standardized format and rest of the components in the monitoring system 300 can generically process them.

Persistence Unit

The monitoring system 300 can rely on a distributed streaming framework (e.g., Apache Spark-streaming) to consume the performance metrics from the message bus 304 in real-time and optionally persist them in the database 306. The database 306 can be a distributed database needed to achieve high-throughput and high-concurrency. The database 306 can maintain historical data for used in the computational framework. The combination of a distributed streaming framework (e.g., Apache Spark) and a distributed storage layer (e.g. Apache HDFS, HBase, Cassandra or OpenTSDB) can scale horizontally and achieve high write throughput while maintaining a low latency. Horizontal scaling is achieved by either increasing the number to streaming agents, which consume the messages in parallel or increase the number of database nodes (i.e., servers) to increase the write throughputs. Also, the database 308 could be co-located with the computation servers (i.e., spark workers) resulting in near linear increase in write throughput as the number of workers are increased. As a result, arbitrary large self-monitoring data can be persisted to cover the system performance history over an arbitrarily long period of time. The monitoring system 300 can use a distributed map-reduce based framework for parallel processing which enables the monitoring system 300 to analyze metrics in near-real time.

Analytics Engine

The analytics engine 310 is connected directly to the message bus 306, to the database 308, or to both the message bus 306 and the database 308. The analytics engine 310 can also leverage a distributed computational framework (e.g., Apache Spark) to perform data analysis. There are two modes of operation for data analysis with the analytics engine 310, namely a) a batch mode which retrieves the data from the database 308, and b) a streaming mode which reads the data from the message bus 306. This framework also supports the combination of the above two modes, commonly known as Lambda architecture and supports a nearly arbitrarily large number of concurrent data analysis processes.

The analytics engine 310 is a computational engine with the ability to perform global analysis based on attributes coming from various sources. By global, the analysis spans across the entire system 100, not simply focused on a single server 102. This is very helpful is tuning the system performance as data coming from a single source might be insufficient to make correct decisions at the system level. Moreover, as more performance metrics are persisted over time, historical data can be leveraged to perform time series analysis and forecast the system load and the probability of a failure. The analytics engine 310 can support data analysis of nearly arbitrary complexity because of its distributed computing power, ranging from simple moving averages and thresholds to complex trend analysis and advanced machine learning.

Policy Engine

The job of the analytics engine 310 is to generate insights about the state and health of the system 100. These insights are then pushed to the policy engine 320. It is then the responsibility of the policy engine 320 to convert the insights into actions using user defined rules and push these actions to the relevant adapters (internal or third party) that perform the corrective actions in the system 100.

Usage of the Self-Correction Engine

Figure 4:
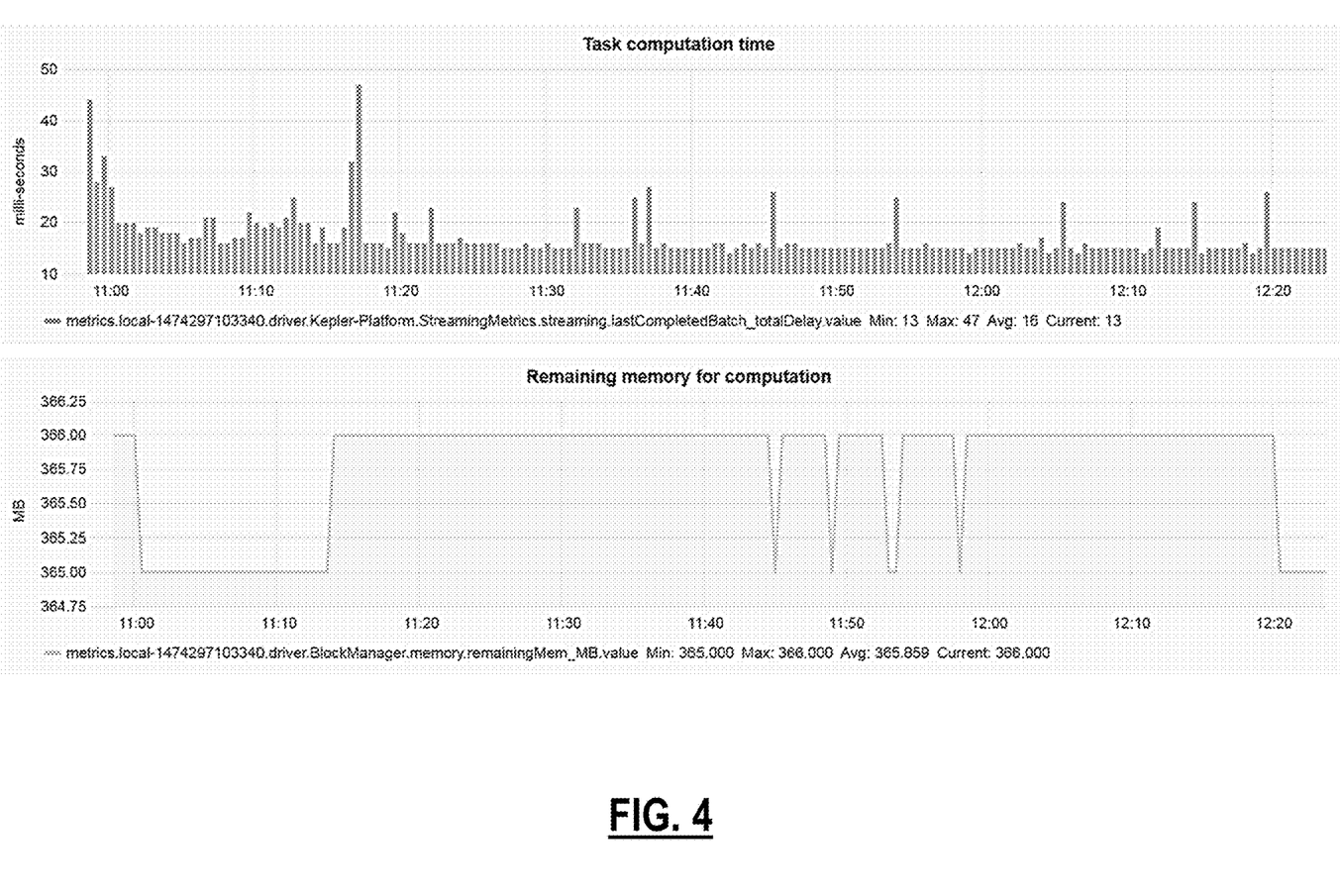
FIGS. 4-5 are graphs of the following metrics as a function of time, a) computation time for a batch of data processed by a spark streaming job b) memory remaining for the spark streaming job, c) Kafka message bus request fulfillment time, and d) fetch rate for Kafka message bus.
Figure 5:
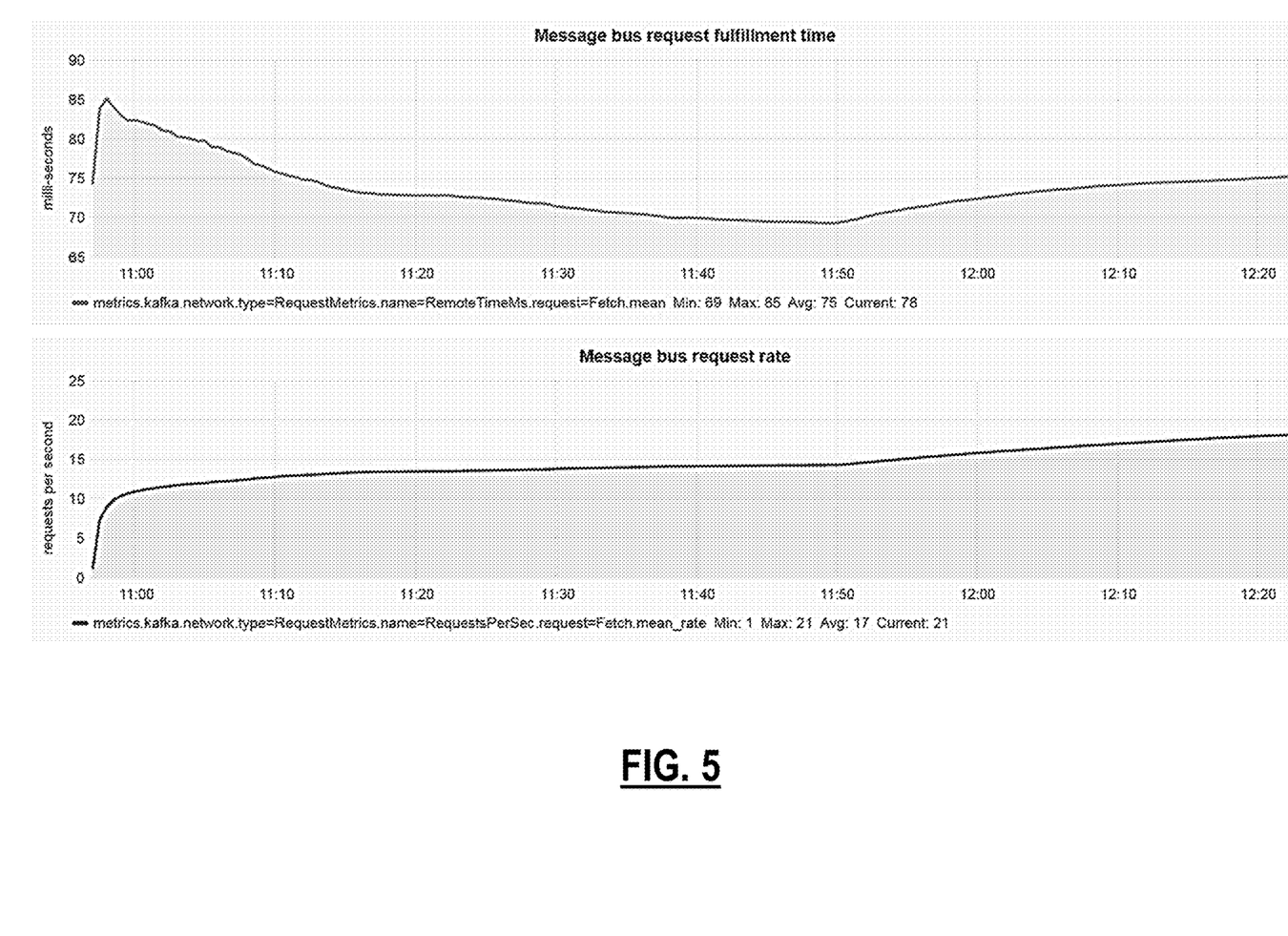

The aforementioned descriptions describe how the monitoring system 300 performs the structure of the self-monitoring and self-correction of the services 104-1, 104-2, 104-3. The foregoing descriptions present examples of how the correction can be used. Referring to FIGS. 4-5, in an exemplary embodiment, graphs illustrate the following metrics as a function of time, a) computation time for a batch of data processed by a spark streaming job b) memory remaining for the spark streaming job, c) Kafka message bus request fulfillment time and d) fetch rate for Kafka message bus.

In this example, the Spark streaming job does a constant amount of work which is to read the data from the Kafka bus and perform a work count. As can be seen in the first plot in FIG. 4, spark streaming jobs between 11:00 to 11:20 GMT have a much higher computation time compared to later jobs. If one were to look at this data alone, one would have suspected that this is a problem with the Spark job and increasing Spark workers might increase performance. However, looking at the first plot in FIG. 5, one can see that during the same time the fetches from the message bus 304 are slower. Hence, the real problem is reading from the message bus 304. Consequently, the correct action would be to tune the message bus 304 instead. In summary, this example shows that in a distributed microservice based system, there is a need to analyze performance metrics coming from various sources (i.e., services 104-1, 104-2, 104-3) to successfully perform self-monitoring and/or self-correction actions.

Disk Usage

Another example of an important system diagnostic operation is to monitor the disk usage. In addition to looking at the currently used disk space, the monitoring system 300 has the ability to predict the amount of disk space that would be used at a future point in time. Hence, it has the ability to perform corrective actions, e.g., delete files, move files to a remote location, add disk storage nodes, etc. before a problem is encountered.

Computational Load

Similar to the disk usage example, the monitoring system 300 can monitor, analyze, and perform a forecast of different performance metrics reported by the services 104-1, 104-2, 104-3. Consequently, the current and forecasted values of these metrics, e.g., CPU RAM usage, queueing time for CPU jobs, the percentage of CPU cycles consumed, etc., could be used to dynamically scale computation nodes in a cloud computing environment.

Scaling Microservices

The concept of dynamic scaling based on real-time performance metrics could be applied to any service 104-1, 104-2, 104-3 in the system 100 that supports dynamic scaling. A concrete example of such a microservice is data acquisition microservice. This service 104 collects telemetry data from hardware devices. Depending on the amount of data generated by these hardware devices, one could scale the number of data acquisition agents (i.e., concurrent processes) used by this microservice or one can create new instances of data acquisition microservices to cope with the workload.

Troubleshooting and Restoring Service Failures

Another important use case for the monitoring system 300 is to constantly monitor all the services 104 in the system 100 via a heartbeat message. The monitoring system 300 would periodically receive messages from all the services 104 in the system 100 to ensure all services 104 are running. The absence of heartbeat messages could trigger a corrective action like a restart of the service 104.

System Tuning and Optimizations

The monitoring system 300 could also be used to monitor metrics that impact system efficiency and tune them to achieve high performance. One example of such a metric is data locality in a distributed computation and storage system. Data locality can greatly impact the computation time for distributed jobs on big data sets (e.g., Apache Spark batch jobs) as fetching the data could become a system bottleneck. The monitoring system 300 could keep a check on the data locality and move data around when system load is low to maintain an optimal system configuration. Other examples include micro-batch latency of streaming jobs, the number of data replicas, data caching and many others, that can all be tuned dynamically by the self-monitoring and self-correction engine.

CONCLUSION

Again, the monitoring system 300 provides a self-monitoring and self-correction engine that enables nearly arbitrarily sophisticated data analysis in near real-time. The results of this analysis—the insights—are then communicated to the policy engine 320 which, in turn, can trigger the execution of nearly arbitrary actions and, as such, closing the feedback loop.

Of note, the boundary between self-monitoring and the monitoring of an external system is very thin. And likewise, the boundary between self-correction and taking corrective actions on an external system is also very thin. In fact, this boundary does not need to exist at all. If relevant, the self-monitoring and self-correction engine described herein can also be used for monitoring and correcting external resources. For instance, in the context of a multi-purpose data analytics platform, the data acquisition, self-monitoring, data streaming analysis, self-correction and policy engine could all be implemented with a single engine as described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A monitoring system for microservices, the monitoring system comprising:
    a processing device;
    a memory;
    a messaging system that is a message bus communicatively coupled to a plurality of microservices in a software system stored in the memory, wherein the messaging system is configured to enable the processing device to i) receive published metrics from one or more of the plurality of microservices, ii) retrieve metrics from additional one or more of the plurality of microservices by querying the additional one or more of the plurality of microservices for the retrieved metrics with a data retrieval agent of the messaging system, the retrieved metrics are different from the published metrics, wherein the retrieved metrics are based on the data retrieval agent pushing the retrieved metrics to the messaging bus and the published metrics are constantly pushed to the messaging bus from a metric sink of each of the one or more of the plurality of microservices, and
    iii) provide the published metrics and retrieved metrics for any of real-time consumption and persistence in a database, wherein the published metrics and retrieved metrics are performance monitoring data associated with operation of the plurality of microservices;
    an analytics engine executed on the processing device and communicatively coupled to the messaging system, wherein the analytics engine is configured to analyze the published metrics and retrieved metrics via one or more of the real-time consumption and persistence from the database to determine insights related to operation of the plurality of microservices to any of automatically recover from faults, elastically scale resources, and optimize performance; and
    a policy engine executed on the processing device and communicatively coupled to the analytics engine, wherein the policy engine is configured to determine actions associated with one or more microservices based on the analysis from the analytics engine and push the actions to the one or more microservices for implementation.

2. The monitoring system of claim 1, further comprising:
    the database communicatively coupled to the messaging system and the analytics engine, wherein the database is configured to store historical metrics, wherein the analytics engine performs one or more of a streaming mode which analyzes the published metrics and retrieved metrics from the messaging system, a batch mode which analyzes the historical metrics in the database, and a combination of the streaming mode and the batch mode.

3. The monitoring system of claim 1, wherein the messaging system receives the published metrics and retrieved metrics in varying formats from the plurality of microservices and converts the varying formats to the single format.

4. The monitoring system of claim 1, wherein the determined actions are based on user-defined rules and pushed to adapters associated with the one or more microservices.

5. The monitoring system of claim 1, further comprising:
    a visualization engine executed on the processing device and configured to provide visualizations of the published metrics and retrieved metrics for all of the plurality of microservices in a unified manner.

6. The monitoring system of claim 1, wherein two or more of the plurality of microservices are executed on different physical hardware interconnected by a network.

7. The monitoring system of claim 1, wherein the determined actions comprise one or more of adjusting disk storage locations, scaling computational nodes, and implementing additional microservices.

8. The monitoring system of claim 1, wherein the messaging system receives heartbeat messages from each of the plurality of microservices which are monitored by the analytics engine, and wherein the policy engine is configured to restart a microservice responsive to a lack of the heartbeat messages.

9. The monitoring system of claim 1, wherein the analysis determines the insights related to present state of the microservices and a forecasted future state of the microservices.

10. A monitoring method for microservices, the method comprising:
    receiving metrics from a messaging system that is a message bus published by a plurality of microservices operating in a software system, wherein the messaging system performs the steps of i) receiving published metrics from one or more of the plurality of microservices, ii) retrieving metrics from additional one or more of the plurality of microservices by querying the additional one or more of the plurality of microservices for the retrieved metrics with a data retrieval agent of the messaging system, the retrieved metrics are different from the published metrics, wherein the retrieved metrics are based on the data retrieval agent pushing the retrieved metrics to the messaging bus and the published metrics are constantly pushed to the messaging bus from a metric sink of each of the one or more of the plurality of microservices, and iii) providing the published metrics and retrieved metrics for any of real-time consumption and persistence in a database, wherein the published metrics and retrieved metrics are performance monitoring data associated with operation of the plurality of microservices;

performing analysis with the metrics via one or more of the real-time consumption and persistence from the database using an analytics engine to determine insights related to operation of the plurality of microservices to any of automatically recover from faults, elastically scale resources, and optimize performance; and determining actions associated with one or more microservices based on the analysis from the analytics engine using a policy engine and pushing the actions to the one or more microservices for implementation.

11. The monitoring method of claim 10, further comprising:

storing historical metrics in a database communicatively coupled to the analytics engine, wherein the analytics engine performs one or more of a streaming mode which analyzes the metrics from the messaging system, a batch mode which analyzes the historical metrics in the database, and a combination of the streaming mode and the batch mode.

12. The monitoring method of claim 10, wherein the messaging system receives the published metrics and retrieved metrics in varying formats from the plurality of microservices and converts the varying formats to the single format.

13. The monitoring method of claim 10, wherein the determined actions are based on user-defined rules and pushed to adapters associated with the one or more microservices.

14. The monitoring method of claim 10, further comprising:

providing visualizations of the metrics for all of the plurality of microservices in a unified manner via a visualization engine.

15. The monitoring method of claim 10, wherein two or more of the plurality of microservices are executed on different physical hardware interconnected by a network.

16. The monitoring method of claim 10, wherein the determined actions comprise one or more of adjusting disk storage locations, scaling computational nodes, and implementing additional microservices.

17. The monitoring method of claim 10, wherein the messaging system receives heartbeat messages from each of the plurality of microservices which are monitored by the analytics engine, and wherein the policy engine is configured to restart a microservice responsive to a lack of the heartbeat messages.

18. An apparatus for microservices monitoring and auto-correction, the apparatus comprising:

one or more processors; and memory storing instructions that, when executed, cause the one or more processors to receive metrics from a messaging system published by a plurality of microservices operating in a software system, wherein the messaging system is configured to i) receive published metrics from one or more of the plurality of microservices, ii) retrieve metrics from additional one or more of the plurality of microservices, the retrieved metrics are different from the published metrics by querying the additional one or more of the plurality of microservices for the retrieved metrics with a data retrieval agent of the messaging system, wherein the retrieved metrics are based on the data retrieval agent pushing the retrieved metrics to the messaging bus and the published metrics are constantly provided to the messaging bus from a metric sink of each of the one or more of the plurality of microservices, and iii) provide the published metrics and retrieved metrics for any of real-time consumption and persistence in a database, wherein the published metrics and retrieved metrics are performance monitoring data associated with operation of the plurality of microservices, perform analysis with the metrics via one or more of the real-time consumption and persistence from the database using an analytics engine to determine insights related to operation of the plurality of microservices to any of automatically recover from faults, elastically scale resources, and optimize performance, and determine actions associated with one or more microservices based on the analysis from the analytics engine using a policy engine and pushing the actions to the one or more microservices for implementation.

* * * * *